Patented June 12, 1951

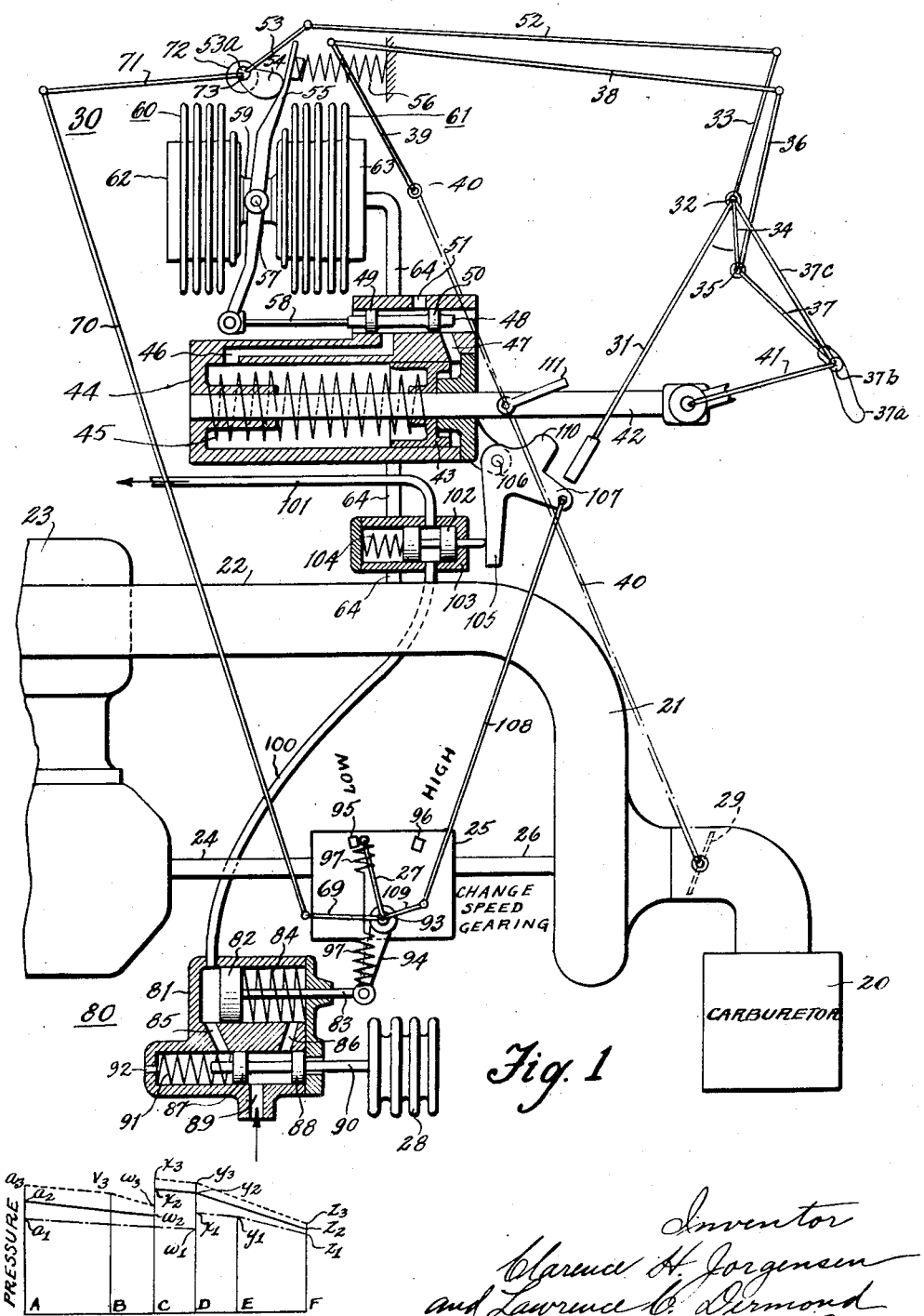

2,556,191

UNITED STATES PATENT OFFICE 2,556,191

POWER PLANT

Clarence H. Jorgensen and Lawrence C. Dermond, Anderson, Ind., assignors to General Motors Corporation, Detroit, Mich., a corporation of Delaware Application March 22, 1943, Serial No. 480,035

15 Claims. (Cl. 123—103).

This invention relates to the control of an airplane engine which drives its supercharger through change-speed gearing. It is an object of the invention so to control the engine and supercharger that an ascent can be made to high altitude in the minimum time while protecting the engine against such over-boosting of the fuel intake pressure as would quickly cause destruction of the engine. During ascent in the lower altitude range the supercharger is driven by the engine at a certain low relative speed, thus restricting the power output to the supercharger to a low value and making more power output available to the propeller. During ascent in the high altitude range, the supercharger is driven by the engine at a certain high relative speed in order to maintain such fuel intake pressure as will enable the engine to develop its maximum rated power until a critical altitude is reached which is substantially higher than the critical altitude for the pressure originally selected for the ascent with low-speed supercharger operation. The change from low-speed supercharger operation to high-speed supercharger operation is accompanied by a boost in pressure commensurate with the increase in horse-power required to operate the supercharger at higher speed. Thus, the power available to the propeller will be the same after the change in supercharger speed as existed before this change. Precaution must be taken that the boost in fuel intake pressure does not raise the pressure to such value that the engine is over-boosted and the pressure of combustion destroys the engine. Therefore the change from low-speed to high-speed operation of the supercharger must come at an altitude which is higher than the altitude which is critical for the maximum pressure selected for the take-off with low-speed supercharger operation in order to allow the pressure to diminish before speed-increase to such lower value that, when the pressure is boosted concurrently with the speed-increase, the horse power output to the propeller after the shift will be substantially the same as the horsepower just before the shift. The altitude which is safe for shift to high gear when the pressure preselected for ascent is maximum obviously will be safe for lower pressure selections.

To accomplish this object, the engine throttle valve and the supercharger change-speed gearing are under a coordinated control provided by an engine intake fuel pressure regulator having manually operable means for selecting various pressures to be maintained and having means responsive to the shifting of the change-speed gearing into high for boosting the selected pressure and provided by altitude responsive means which will not effect the shift into high gear until at least that altitude is attained which is safe for shift when maximum take-off pressure has been pre-selected. In case the preselected pressure to be maintained by the supercharger is of such low value that the critical altitude for that pressure selected with low-speed supercharger operation exceeds the safe-for-shift altitude, there is no need to shift at the safe-for-shift altitude as the engine does not begin to lose power until the higher, critical altitude is reached. Therefore the shift must be deferred until the higher, critical altitude is reached. Consequently, the gear-shift mechanism is under the joint control of an aneroid which performs a function at the safe-for-shift altitude and the engine pressure-regulator which performs a function when the throttle has been moved to wide-open position.

In the disclosed embodiment of the present invention, there is an aneroid which moves the valve of an hydraulic servo for the purpose of causing the servo to shift the gearing connecting the engine with the supercharger from low speed condition to high speed condition when the safe-for-shift altitude is attained. The servo is not operative to shift the gearing until the throttle has been moved by the regulator to wide open position. To provide for control of the servo by the regulator, the servo cylinder is connected with a bleed pipe having a valve which is normally open to prevent building up hydraulic pressure in the cylinder. This bleed valve is closed by an operation of the regulator which causes the throttle valve to be fully opened.

Further objects and advantages of the present invention will be apparent from the following description reference being had to the accompanying drawings wherein a preferred embodiment of the present invention is clearly shown.

In the drawings:

Fig. 1 of the drawings is a diagram of an embodiment of the present invention.

Fig. 2 is a chart showing the relation of altitudes and intake pressures.

According to Fig. 1, a carburetor 20 supplies combustible mixture to inlet of a supercharger 21 whose outlet is connected by pipe 22 with the intake ports of an engine 23. Engine 23 drives a shaft 24 connected by change-speed gearing 25 with a shaft 26 which drives the supercharger 21. Gearing 25 is in low speed condition when change speed lever 27 is in the low position shown. If lever 27 is moved clockwise to high position, the gearing 25 is in high speed condition and supercharger runs at a rate relative to engine speed which is higher than when lever 27 is in low speed position.

The lever 27 is under control of an aneroid 28 and a throttle valve regulator 30 which determines the extent of opening of a throttle valve 29 in the duct between carburetor 20 and supercharger 21.

The regulator 30 has a main control lever 31 which is manually operated from the pilot's seat. Lever 31 is pivoted at 32 and operates arms 33 and 34. Arm 34 carries the fulcrum 35 for bell-crank lever arms 36 and 37. Arm 36 is connected by link 38 with arm 39 attached to shaft 40 attached to throttle valve 29. Arm 37 has a cam slot 37a which receives a cam follower roller 37b carried by a link 41 connected with the piston rod 42 of an hydraulic servomotor having a piston 43 slidable in a cylinder 44 and urged toward the right by a spring 45. Roller 37b is connected also with an arm 37c pivotally supported at 32. Cylinder 44 has ports 46 and 47 controlled by a valve 48 having lands 49 and 50 capable of covering both ports 46 and 47 simultaneously, or of placing pressure fluid inlet 51 in communication with either one of these ports.

Arm 33 is connected by link 52 with an arm 53 connected with shaft 53a for rotating a pressure selecting cam 54 against which a lever 55 is urged by a spring 56. Lever 55 is fulcrumed at 57 and is connected by rod 58 with valve 48. Fulcrum 57 is supported by bridge 59 connecting the free ends of metal bellows 60 and 61 having their ends 62 and 63, respectively, fixed. Bellows 60 is sealed and evacuated. Bellows 61 is connected by pipe 64 with the fuel duct 22. The bellows 60 and 61 contain springs not shown which are so calibrated that fulcrum 57 moves in a predetermined relation to changes in engine intake pressure.

The normal position of the piston rod 42 is shown. Movement of lever 31 counterclockwise from the idle position shown causes an opening movement of throttle 29 and a counterclockwise movement of cam 54 thereby causing lever 55 to locate valve 48 so that pressure fluid inlet 51 communicates with cylinder port 47. Then rod 42 moves left to effect whatever further opening movement of throttle valve 29 is required to maintain the fuel intake pressure selected by cam 54 when moved from its normal position by movement of lever 31 counterclockwise. When the selected pressure is attained, bellows 61 will have expanded to an extent such that fulcrum 57 moves to cause valve 48 to be placed in position for closing both ports 46 and 47 of cylinder 44. As the altitude increases, rod 42 will move further and further toward the left to cause the selected pressure to be maintained. Critical altitude for a selected pressure is attained when the piston 43 has moved to the limit of travel toward the left, so that opening movement of the throttle valve 29 ceases. The lengths and locations of the levers and the shape of the cam slot 37b of the regulator are such that the throttle valve 29 can be moved by the piston 43 to wide open position for pressure selections over a relatively wide range, as from minimum cruise to emergency. This feature is disclosed in detail in the copending application of Jorgensen and Taylor, S. N. 612,392 filed August 24, 1945.

The pressure selected by the location of cam 54 is gradually reduced as altitude increases due to the fact that the area of bellows 60 subjected to atmospheric pressure is less than the area of bellows 61. The difference in area is such that, at critical altitude for low relative speed operation of the supercharger, the selected pressure has dropped a few percent from the selected ground level pressure. This drop in pressure is allowed because the engine exhaust back pressure decreases as altitude increases.

When a certain altitude is reached which is critical for a certain selected pressure with low-speed blower operation, the rod 42 will have moved to its extreme left position and the throttle valve 29 will be wide open. That altitude is called critical because, if exceeded, the fuel intake pressure decreases rapidly and the engine loses power. The higher the pressure selection, the lower will be the critical altitude and viceversa. Therefore means responsive to a predetermined altitude and to a function of regulator 30 are provided for increasing the speed of supercharger 21 so that the higher altitudes can be reached without loss of power.

The means for increasing the speed of the supercharger 21 comprises an hydraulic servomotor 80 having a cylinder 81 enclosing a piston 82 connected by rod 83 with a lever 94 loosely journalled on a shaft 93 with which gear shift lever 27 is connected. Lever 94 is normally held in the position shown by spring 84 or by oil pressure at the right of piston 82. When lever 94 is in the position shown, the spring 97 connecting it with lever 27 holds the latter in "low" position against a stop 95. When the oil pressure at the left of piston 82 is sufficient to overcome spring 84, lever 94 begins moving right. Finally the center line of spring 97 passes to the right of the shaft 93 thus causing the lever 27 quickly to move clockwise to "high" position against a stop 96. Therefore, altho the movement of lever 94 may be gradual, the gear shift lever 27 moves with a snap action in either direction. In case of failure of oil pressure, spring 84 is able to return lever 27 in "low" position. Cylinder 81 has ports 85 and 86 with either of which a fluid pressure inlet port 89 may be connected depending on the location of valves 87 and 88. These valves are connected with a rod 90 actuated by the aneroid 28. A spring 91 normally maintains the valves 87 and 88 in the position shown.

When the safe-for-shift altitude is reached, the aneroid 28 will have expanded and moved the valves 87 and 88 so as to cut off port 86 and to place port 89 in communication with port 85, but the piston 82 will not move toward the right unless the regulator 30 has moved the throttle valve 29 to wide open position. Until the throttle valve 29 has been moved to wide open position, the cylinder 81 is bled through pipes 100 and 101 leading to a return to the low pressure side of the oil supply. A valve 102 in a cylinder 103 controls the bleed. Valve 102 is urged to normally open position by a spring 104. A lever 107, integral with lever 105, is connected by a cable 108 with a lever 109 connected with lever 27. A surface 110, integral with levers 105 and 107 is engaged by an arm 111 attached to throttle shaft 40. When the regulator 30 has moved throttle 29 to wide open position, the arm 111 will have engaged surface 110 and will have moved levers 105 and 107 clockwise to cause valve 102 to block the escape of pressure oil from pipe 100 and to cause the cable 108 to bend. Then the piston 82 and the lever 27 move right to shift the gearing 25 from low to high to increase the speed ratio between the supercharger and the engine. The fuel intake pressure increases to enable the engine to develop the power required for higher altitudes.

Clockwise movement of lever 27 is accompanied by clockwise movement of arm 109 which causes the cable 108 to become taut so as to hold the levers 107 and 105 in position for causing valve 102 to block pipe 100. Therefore, although the regulator 30 may operate, after the shift of gearing 25 into high to move the throttle valve 29 toward closed position, the bleed of cylinder 81 remains closed and the gearing 25 remains in high speed condition until the altitude decreases slightly below safe-for-shift altitude.

A lever 69 is connected with shaft 93 and by a link 70 with a lever 71 which rotates a shaft 72 having its axis 73 below the axis of selector cam shaft 53a which is supported by shaft 72. When shaft 93 is rotated clockwise to shift the change speed gearing 25 into high gear condition, shaft 72 is rotated counterclockwise to cause cam 54 to move toward the left to allow spring 56 to move lever 55 counterclockwise. This so modifies the operation of the regulator as to cause it to maintain an intake pressure which is greater than the pressure which existed before the gearing 25 was shifted into high. Increase of intake pressure causes the engine to develop additional power required to operate the supercharger at higher relative speed, while the power available to the propeller is as great as immediately before the shift took place.

The airplane can now climb to greater altitudes without loss of power until that altitude is reached which is critical for the selected pressure with the supercharger operating at high relative speed. The shift into high gear is made only when at least the safe-for-shift altitude has been reached and when the throttle has been moved by the regulator into wide-open position. Once the supercharger gearing has been shifted into high gear, it remains in high gear so long as at least the safe-for-shift altitude is maintained or exceeded altho the throttle may be partly closed, because the shifting of lever 27 to high speed position holds the bleedvalve 102 closed. Only the shifting of valves 87 and 88 back to normal position when the altitude falls below the safe-for-shift altitude can cause lever 27 to return to low gear position.

This system of control provides for automatically maintaining an engine power output required for rapid ascent into high altitudes, but without burdening the engine with high speed operation of the supercharger until it is necessary to operate it at high speed to reach the desired high altitude without loss of power. Furthermore the engine is protected against over-boosting by withholding the shift and the increase of pressure selection until at least a safe-for-shift altitude is attained.

Fig. 2 shows examples of pressure control starting at ground level altitude A, with selected pressures $a_1$, $a_2$ or $a_3$. At safe-for-shift altitude C, the aneroid 28 shifts the rod 90 left and places port 85 in communication with pressure oil inlet passage 89. Take first the case when C is also the altitude which is critical for a certain selected pressure $a_2$ with low speed supercharger operative. Pressure $a_2$ is, for example, suitable for normal cruise. Pressure $a_2$ droops gradually to $w_2$ at altitude C. At altitudes higher than C the pressure would decrease rapidly because piston 43 already had moved left to the limit of travel and the throttle had fully opened. Therefore at altitude C, the supercharger gearing is shifted into high as the result of substantially concurrent closing of the bleed pipe 100 and the movement of valve rod 90 fully to the left. At altitude C, the supercharger rotates faster and the pressure increases to $x_2$ which exceeds $a_2$ by an amount commensurate with the increased power required to operate the supercharger at increased speed, thus leaving the horsepower output to the propeller the same as before the shift. Pressure $x_2$ falls gradually to $y_2$ at altitude D which is critical for that pressure. Then the pressure decreases more rapidly from $y_2$ to $z_2$ at altitude F.

Another example is when safe-for-shift altitude C is higher than the critical altitude for a selected pressure. The pressure selected at ground level A is pressure $a_3$ which droops to $v_3$ at altitude B which is critical for that pressure. The servo-piston 43 has moved fully left to the limit and bleed controlling valve 102 is closed; but there is no shift of the supercharger gearing because safe-for-shift altitude C has not been reached. At altitude C, the pressure has fallen to $w_3$. Then the supercharger gearing is shifted into high upon completion of the movement of valve rod 90 to the left. The pressure rises to $x_3$, which is in excess of $a_3$ but still safe for the engine, and droops to $y_3$ at about altitude D which is critical for that pressure. Then the pressure falls more rapidly to $z_3$ at altitude F.

Another example is when safe-for-shift altitude C is lower than the critical altitude for a selected pressure. The pressure $a_1$ selected at ground level is a below normal cruising pressure, which droops to $w_1$ at about altitude D which is critical for that pressure. When altitude C had been attained valve rod 90 had moved fully to the left, but no shift of the supercharger gearing took place because bleed pipe 100 had not yet been blocked by valve 102. At altitude D, the servo-motor piston 43 had moved fully left and bleed controlling valve 102 had fully closed. Then the gearing was shifted into high and the pressure rises to $x_1$ which exceeds $a_1$. The pressure droops from $x_1$ to $y_1$ at altitude E which is critical for that pressure. Then the pressure falls more rapidly to $z_1$ at altitude F.

Once the change speed gearing has been shifted into high the gearing will remain in high so long as the altitude is at least C, the safe-for-shift altitude. It follows that, if the pressure selections are such that the critical altitudes for low gear operation are C or less, the pressure changes during descent from F to A are substantially the same as ascent from A to F. The only difference is due to the fact that shift back into low gear takes place at an altitude slightly lower than C. But, if the pressure selections are such that critical altitude for low gear operation are in excess of C, the pressure changes during descent from F to A are not all the same as during ascent from A to F. For example, if $a_1$ has been the pressure selected for operation at altitude A, in descending from F, the pressure would not fall from $x_1$ to $w_1$ at altitude D, because there would be no shifting back into low gear at altitude D. In descending from D to C the pressure would rise above $x_1$ for example to a pressure between $w_2$ and $w_3$, and then the shift would be made into low at an altitude slightly less than C, and the pressure would fall to the $a_1$—$w_1$ line.

While the embodiment of the present invention as herein disclosed constitutes a preferred form, it is to be understood that other forms might be adopted, all coming within the scope of the claims which follow.

What is claimed is as follows:

1. A power plant comprising an internal combustion engine having a fuel intake, a supercharger connected with the fuel intake, means for driving the supercharger by the engine including change-speed gearing, a member for shifting the gearing and movable from a low-gear position to a high gear position, an hydraulic servo-motor for moving the member and having two valves for controlling its operation, a throttle valve controlling the intake pressure produced by the supercharger, a throttle valve regulator for maintaining a pressure with changing altitude, means operating when a predetermined altitude is reached for actuating one of the controlling valves, and means under the control of the regulator for actuating the other controlling valve when the throttle valve has been moved to a predetermined open position.

2. A power plant comprising an internal combustion engine having a fuel intake, a supercharger connected with the fuel intake, means for driving the supercharger by the engine including change-speed gearing, a member for shifting the gearing and movable from a low-gear position to a high gear position, an hydraulic servo-motor for moving the member and having a control valve, a throttle valve controlling the intake pressure produced by the supercharger, a throttle valve regulator for maintaining a pressure with changing altitude, an aneroid operating, when a predetermined altitude has been reached, to shift the valve of the servo-motor into a position for causing the servo-motor to receive pressure fluid, a normally open bleed for the servo-motor which prevents operation thereof, a valve for closing said bleed, and means under the control of the regulator for closing said bleed valve when the throttle valve has been moved to a predetermined open position.

3. A power plant comprising an internal combustion engine having a fuel intake, a supercharger connected with the fuel intake, means for driving the supercharger by the engine including change-speed gearing, a member for shifting the gearing and movable from a low-gear position to a high gear position, an hydraulic servo-motor for moving the member and having a control valve, a throttle valve controlling the intake pressure produced by the supercharger, a throttle valve regulator for maintaining pressure with changing altitude, an aneroid operating, when a predetermined altitude has been reached, to shift the valve of the servo motor into a position for causing the servo motor to receive pressure fluid, a normally open bleed for the servo-motor which prevents operation of the servo-motor, a valve for closing said bleed, means under the control of the regulator for closing said bleed valve when the throttle valve has been moved to a predetermined open position, and means responsive to movement of the change-speed member into high-gear position for holding the bleed valve in closed position.

4. A power plant for aircraft comprising an internal combustion engine having a fuel intake, a supercharger connected with said fuel intake, means for driving the supercharger by the engine including a change speed gearing, a member for shifting the gearing from one of its positions to another, automatic fluid pressure operated means for moving said member, a throttle valve movable to different positions to control the intake pressure produced by the supercharger, an automatic pressure regulator for variably positioning the throttle valve to control the intake pressure in relation to the altitude, and means controlled in response to atmospheric pressure and by movement of the throttle valve by said pressure regulator to a predetermined position, to effect movement of said gear shifting member.

5. A power plant for aircraft comprising an internal combustion engine having a fuel intake, a supercharger connected with said fuel intake, means for driving the supercharger by the engine including a change speed gearing, a member for shifting the gearing from one of its positions to another, automatic fluid pressure operated means for moving said member, a throttle valve movable to different positions to control the intake pressure produced by the supercharger, an automatic pressure regulator for variably positioning the throttle valve to control the intake pressure as the aircraft is operated at different altitudes, and means controlled in response to atmospheric pressure and by movement of the throttle valve to a predetermined open position to cause said fluid pressure operated means to effect movement of said gear shifting member from low gear to high gear position when a predetermined altitude is reached, said last mentioned means including means operatively connected to said throttle valve compelling actuation of said last mentioned means upon movement of said throttle valve to said predetermined open position.

6. A power plant for aircraft comprising an internal combustion engine having a fuel intake, a supercharger connected with said fuel intake, means for driving the supercharger by the engine including a change speed gearing, a member for shifting the gearing from one of its positions to another, automatic fluid pressure operated means for moving said member, a throttle valve movable to different positions to control the intake pressure produced by the supercharger, an automatic pressure regulator for variably positioning the throttle valve to control the intake pressure as the aircraft is operated at different altitudes, means controlled in response to atmospheric pressure and a second means controlled by action of said throttle valve regulator for causing said fluid pressure operated means to effect movement of said gear shifting member from low gear to high gear position when a predetermined altitude is reached.

7. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, mechanism for direcly controlling the operation of said servomotor including a means operated by altitude pressure when a predetermined altitude is reached and a second means operated by the pressure regulator.

8. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, mechanism for directly controlling the operation of said servomotor including a means operated by altitude pressure when a predetermined altitude is reached, and a second means operated by the throttle valve as it is moved to a predetermined position by said pressure regulator.

9. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, mechanism for directly controlling the operation of said servomotor including a means operated by altitude pressure when a predetermined altitude is reached, and a second means operated by the pressure regulator as it effects movement of the throttle valve to wide open position.

10. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, mechanism for directly controlling the operation of said servomotor including a means operated by altitude pressure when a predetermined altitude is reached, and a second means operated by the throttle as said throttle is moved to wide open position by the pressure regulator.

11. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, two valves for directly controlling the operation of said servomotor, means controlled by altitude pressure for operating one of said valves when a predetermined altitude is reached, and means operated by the pressure regulator for actuating the other of said valves.

12. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, two valves for directly controlling the operation of said servomotor, means controlled by altitude pressure for operating one of said valves when a predetermined altitude is reached, and means actuated by the throttle as said throttle is moved to a predetermined position by said pressure regulator for actuating the other of said valves.

13. A power plant comprising an internal combustion engine having a fuel intake, a supercharger connected with the fuel intake, means for driving the supercharger by the engine including change speed gearing, a member for shifting the gearing and movable from a low gear position to a high gear position, a hydraulic servomotor for moving the member and having two valves for controlling its operation, a throttle valve controlling the intake pressure produced by the supercharger, a throttle valve regulator for maintaining a pressure with changing altitude, means operating when a predetermined altitude is reached for actuating one of the controlling valves, means under the control of the regulator for actuating the other controlling valve when the throttle valve has been moved to a predetermined open position, means for selecting a pressure to be maintained by said pressure regulator and means operated by the gear shifting mechanism for increasing the pressure selection when said gear shifting mechanism is moved to high gear position.

14. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, mechanism for directly controlling the operation of said servomotor including a means operated by altitude pressure when a predetermined altitude is reached, a second means operated by the pressure regulator as it effects movement of the throttle valve to wide open position, means for selecting a pressure to be maintained by said pressure regulator and means operated by the gear shifting mechanism for increasing the pressure selection when said gear shifting mechanism is moved to high gear position.

15. A power plant for aircraft comprising an internal combustion engine having a fuel mixture intake, a supercharger connected to said intake, a driving connection between the supercharger and the engine including change speed gearing, a hydraulic servomotor for shifting said gearing from low gear to high gear position, a throttle valve movable to different positions to control the pressure maintained in the mixture intake, an automatic pressure regulator for variably positioning the throttle valve to control the intake pressure as the aircraft is operated at different altitudes, two valves for directly controlling the operation of said servomotor, means controlled by altitude pressure for operating one of said valves when a predetermined altitude is reached, means operated by the pressure regulator for actuating the other of said valves, means for selecting a pressure to be maintained by said pressure regulator and means operated by the gear shifting mechanism for increasing the pressure selection when said gear shifting mechanism is moved to high gear position.

CLARENCE H. JORGENSEN.
LAWRENCE C. DERMOND.

REFERENCES CITED

The following references are of record in the file of this patent:

UNITED STATES PATENTS

| Number | Name | Date |
|---|---|---|
| 2,134,742 | Stanton | Nov. 1, 1938 |
| 2,217,364 | Halford et al. | Oct. 8, 1940 |
| 2,228,239 | Ammann | Jan. 14, 1941 |
| 2,310,831 | Bielitz | Feb. 9, 1943 |

FOREIGN PATENTS

| Number | Country | Date |
|---|---|---|
| 524,730 | Great Britain | Aug. 13, 1940 |
| 548,778 | Great Britain | Oct. 23, 1942 |